United States Patent Office 2,827,028
Patented Mar. 18, 1958

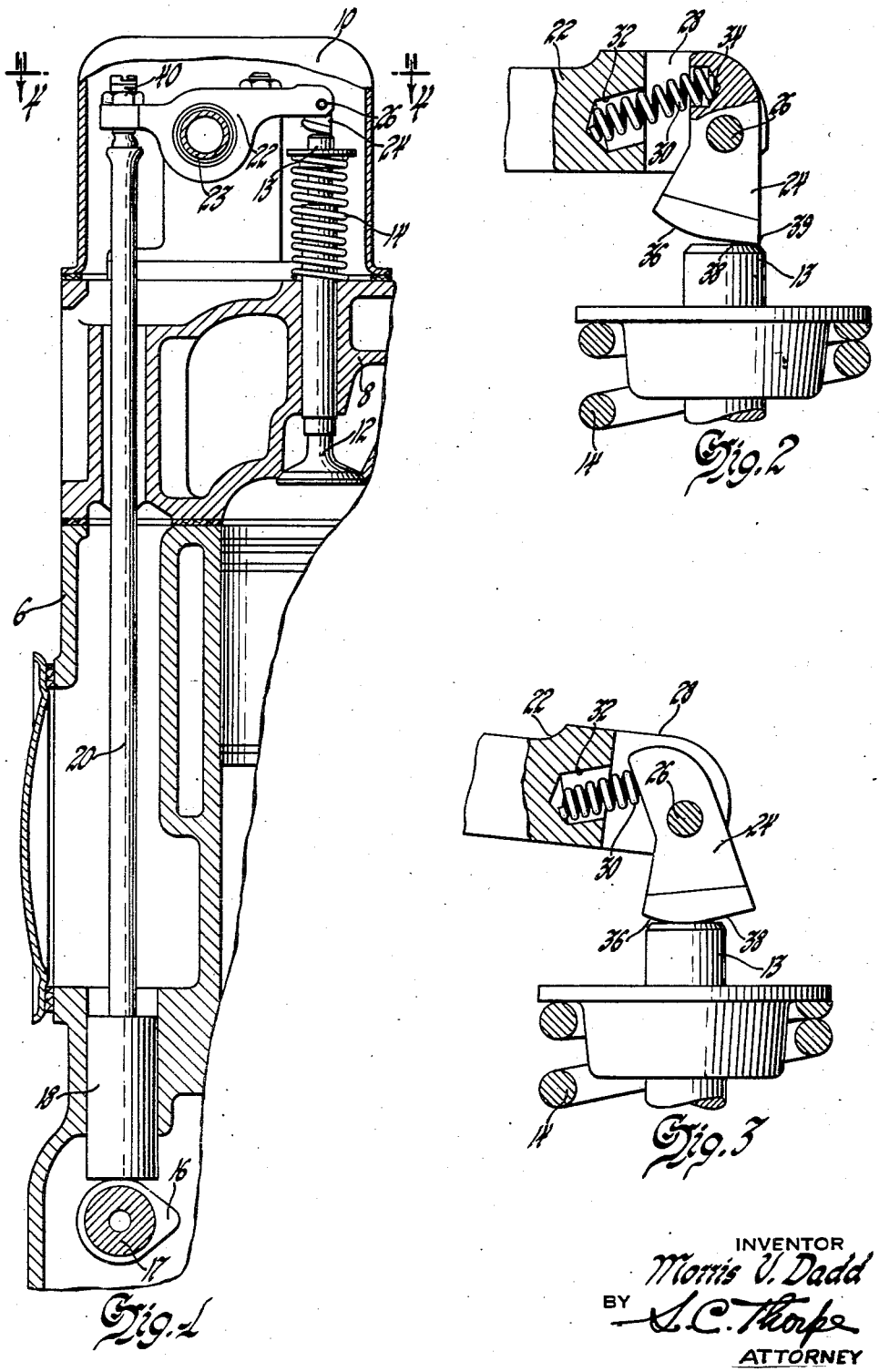

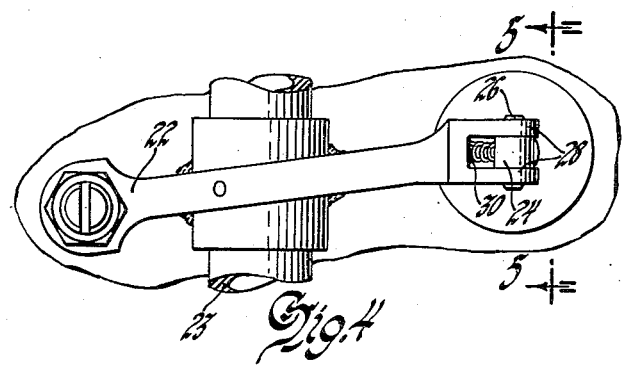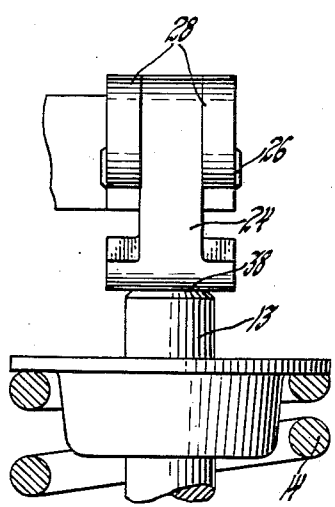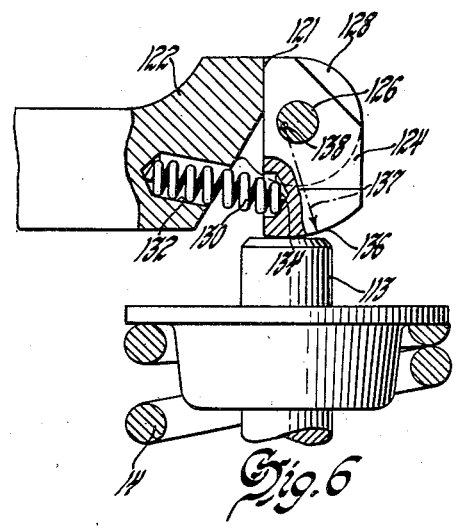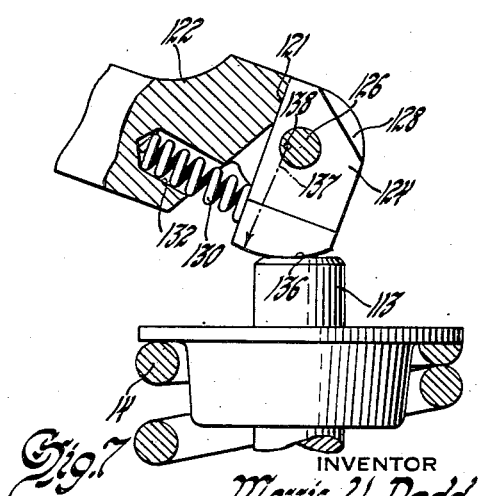

2,827,028

VALVE SILENCER

Morris V. Dadd, Grand Rapids, Mich., assignor to General Motors Corporation, Detroit, Mich., a corporation of Delaware Application October 27, 1953, Serial No. 388,642

10 Claims. (Cl. 123—90)

This invention has to do with slack take-up silencing mechanism for motion transmitting mechanisms, particularly for those used to operate the valves of internal combustion engines.

In such movements the slack or lost motion varies as the result of contraction and expansion as well as from wear of the individual members. Consequently such mechanical movements must be adjusted to provide enough slack to make sure when the members are heated that the expansion of these members will not maintain a given member in an over-extended position, e. g., holding the valve off its seat in an internal combustion engine. In the absence of means for silencing the slack take-up, an objectionable chattering or clicking noise occurs as the members periodically strike each other. Also, when the motion-transmitting members operate at relatively high speed, as is the case in engine valve operating trains, the impacts producing such noise have the further harmful effect of increasing the wear and shock damage to the parts. In an effort to minimize this latter effect in cam-operated valve mechanisms, long ramps on the valve-lifting cam surfaces are used. Due to the variation in the amount of slack with change in operating temperature, however, this expediency aggravates the difficulty of maintaining proper valve timing for optimum engine performance.

It is an object of this invention to provide a motion-transmitting mechanism having some slack or lost-motion in operation, as for example an engine valve operating train, with an improved means for silencing the take-up of such slack.

It is a further object, in the specific application of the invention to rocker-reciprocated members such as poppet valves of internal combustion engines, to provide an improved silencing means including an articulated rocker and cam-surfaced pad which enables maintaining substantially the same ratio of movements of the rocker and reciprocated member as in a conventional rocker-type operating mechanism, and which is so designed that the forces acting thereon throughout its operating cycle preclude any interference with the reciprocating member making its full stroke in each direction.

It is a further and more specific object of this invention to provide such a silencer in the form of a valve rocker having a spring-biased pivotally mounted lost-motion take-up pad which is of simple and rugged design for economical manufacture and long operating life.

Other objects and advantages of the invention will become apparent from the following detailed description when read in conjunction with the following drawings, in which:

Figure 1 shows a fragmentary cross sectional view of an engine valve train embodying a pivotally mounted indexing cam constructed in accordance with the present invention;

Figure 2 is an enlarged fragmentary view similar to Figure 1 and showing one form of the indexing cam pad in the valve closed position;

Figure 3 is a view similar to Figure 2 but with the parts in valve open position;

Figure 4 is an enlarged fragmentary top view of the rocker arm and indexing cam assembly as viewed from line 4—4 of Figure 1;

Figure 5 is a further enlarged fragmentary view of the indexing cam assembly taken on the line 5—5 of Figure 4 and showing the cam in the valve closed position of Figure 2;

Figures 6 and 7 are views similar to Figures 2 and 3 but showing a modified form of my invention.

Referring first to Figure 1, the numeral 6 indicates a cylinder block, 8 indicates a portion of the cylinder head, and 10, the valve cover of an internal combustion engine of the overhead valve type. One of the valves 12 is shown reciprocably mounted in the cylinder head and is held tightly on its valve seat during non-operating portions of its operating cycle by the usual coil spring 14. The cam 16 is rotatably mounted in the block on the cam shaft 17 and acts through the reciprocably mounted tappet 18 and push rod 20 to rock the rocker arm 22 about its pivot 23. A slack or lost-motion take-up silencer device, constructed in accordance with my invention, serves to transmit the valve-actuating force between the rocker arm 22 and the valve stem 13 which are arranged in spaced relation to each other and provides the necessary slack in the mechanism.

The silencer device shown in Figures 2–4 comprises an indexing cam pad 24 pivoted at 26 between the bifurcated end portions 28 of the rocker arm 22. The cam pad 24 is yieldingly urged about the pivot 26 in a clockwise direction (as viewed in Figures 2 and 3) by a helical spring 30 which is interposed between the rocker arm and the cam pad and seated in the bores 32 and 34 formed therein respectively. This cam pad 24, as best shown in Figures 2 and 3, has a cam surface constituting a take-up wedge for accommodating lost-motion in the valve-operating mechanism and is formed of an arcuate portion 36 having a constant radius about the axis of the pivot 26 and a flat portion 38 which is tangential to the arcuate portion.

An adjusting screw, as shown at 40, provides the proper amount of slack or clearance in the valve-operating mechanism to compensate for thermal expansions and contractions. With valve 12 in closed position and the tappet engaging the base circle of cam 16, proper valve train clearance for a cold engine is provided when the indexing cam pad 24 is in the position shown in Figure 2 with the toe 39 of the flat portion of the cam surface in engagement with the periphery of the top of the valve stem 13. As the engine warms up, the clockwise slack-take-up rotation of the cam pad is restricted due to the expansion of the valve train parts, while wear of these parts allows the indexing cam to rotate clockwise to compensate for such additional slack clearance.

In operation, as the tappet 18 leaves the base circle of the cam 16 on each lift stroke, the divergent relation of the tangential flat portion 38 of the pad 24 to the top of the valve stem 13 during the initial valve opening movement of the rocker arm 22 causes the pad to rotate counter-clockwise. Its flat portion 38 thus slides on the valve until all of the slack has been removed from the system. When the slack has been removed the arcuate portion 36 rolls on the valve stem without any further slippage and the valve is opened by further movement of the rocker arm. The rotation between the rocker arm 22 and the pad 24 during the slack removing and valve opening movement of the rocker arm compresses the pad biasing spring 30.

During the return of the valve to its seat by the action of the valve spring 14 no slippage occurs between the cam surface and the valve stem until the valve is seated.

Then, as the tappet regains its base circle position and clearance between the valve train parts occurs, the spring 30 rotates the pad in a clockwise direction, causing the flat portion of the pad surface to slide on the valve stem and maintains those parts in contact while taking up the slack or lost-motion clearance between the various other parts.

It will be noted that due to the design of the cam surface and its pivotal relationship to the rocker arm, the valve will be open only when the cam surface is in rolling contact with the valve stem 13 and the valve is positively controlled during its closing movement.

In the modified form of my invention, as shown in Figures 6 and 7, the indexing cam pad 124 is pivotally mounted at 126 between the bifurcated end portions 128 of the rocker arm 122 and has an arcuate cam surface 136 which is formed on a constant radius 137 having its center 138 passing through the pivotal mounting pin 126 but in spaced off-center relation to the axis of the pin. The off-center location of the radius center 138 is on the side of the pivot 126 closest to the rocker arm pivot, thereby providing a cam angle of relatively small slope between the came surface 136 and the top of the valve stem 113. The rocker arm 122 is provided with a stop 121 for limiting the counter-clockwise rotation of the cam pad. The spring 130 has its opposite ends seated in opposing bores 132 and 134 of the rocker and pad in a manner similar to but on the opposite side of the pad pivot from that of the spring 30 in the previously described silencer, and acts to resiliently oppose movement of the pad away from the stop 121.

In operation, the adjusting screw 40 is adjusted with the engine cold so that the cam pad 124 is rotated counter-clockwise by the spring 130 into abutment with the stop 121, as shown in Figure 6, thereby removing all clearance in the valve train when the valve 12 is seated and the tappet 22 is on the base circle of the cam 16. While the transmitted valve opening force will tend to rotate the cam pad in a clockwise direction due to the off-center loading of the cam surface, the action of the spring 130 and the frictional force exerted by the valve stem 113 on the cam surface 136 will be sufficient to maintain the cam pad in abutment with the stop 121 as the rocker arm 122 is rotated in a valve opening (clockwise) direction. Consequently, the cam surface of the pad 124 is caused to slip on the top of the valve stem 113 while the valve is opening. When the rocker arm 122 is rotated in the valve closing (counter-clockwise) direction, the pad will break contact at the rocker arm stop and the cam surface will roll on the valve stem without any slippage until the valve is seated since the off-center loading of the cam surface and the frictional reaction between the cam surface 136 and the top of the valve stem 113 will act in conjunction with each other to negate the tendency of spring 130 to rotate the pad clockwise. As the valve seats, the spring 130 will rotate the cam counter-clockwise to take up the lost-motion clearance between the cam and the valve stem as it occurs, keeping all parts in contact.

As the engine warms up, the valve train elements will expand causing the distance between the center 138 of the cam pad arcuate surface 136 and the top of the valve stem to decrease. This distance change controls the amount of counter-clockwise slack take-up rotation that is necessary and that the cam can make at the end of each valve closing stroke. Consequently, as the engine warms up the cam pad will not return to abutting relation with the rocker arm stop during the closing operation. However, during the initial phase of the valve opening movement of the rocker arm, frictional force acts on the cam surface 136 in conjunction with the spring 130 to effect counter-clockwise rotation of the cam pad 124 against the stop 121.

It will be seen that a valve silencer and slack take-up mechanism constructed according to my invention and used in conjunction with a valve operating train will provide a positive valve control action during both valve opening and valve closing portions of the valve operating cycle. Such a valve silencer will eliminate variations in valve timing which are detrimental to engine performance, and is of a simple design which will be easy and economical to manufacture, assemble and adjust.

The foregoing description of the invention is explanatory thereof and various changes in the size, shape and materials as well as in the terms of the illustrated construction may be made within the scope of the appended claims without departing from the spirit of the invention.

I claim:

1. In a valve operating mechanism, a reciprocable member having a surface facing one end of its reciprocatory stroke, an arm longitudinally spaced from and having an axis of rocking movement laterally spaced from said end facing surface, means limiting movement of said arm in the direction away from said end facing surface and movement of said member in the direction toward said arm, a pad having a pivotal connection with said arm restraining their relative movement to movement about a single axis extending transversely to the reciprocatory movement of said reciprocable member, said pad having a cam surface engaging said end facing surface and accommodating a limited lost motion of the pad about said single axis when said arm and reciprocable member are at the said means-limited ends of their rocking and reciprocatory movements, respectively, resilient means reacting against said pad and arm to take up said lost-motion and maintain said cam surface engaged with said end facing surface, said cam surface having an arcuate portion of constant radius about said pivotal connection having rolling engagement with said end facing surface during movement of the reciprocable member to and from said limited end of its movement and an adjacent portion tangential to said arcuate portion having sliding engagement with said end facing surface during movement of the arm to and from the said limited end of its movement while said resilient means takes up said lost-motion of said pad.

2. In a valve silencing mechanism, a reciprocable member having a surface facing one end of its reciprocatory stroke, an arm longitudinally spaced from and having an axis of rocking movement laterally spaced from said end facing surface, means limiting movement of said arm in the direction away from said end facing surface and movement of said reciprocable member in the direction toward said arm, a pad having a pivotal connection with said arm restraining their relative movement to movement about a single axis extending transversely to the reciprocatory movement of said reciprocable member, said pad having a cam surface engaging said end facing surface and accommodating a limited lost-motion of the pad about said single axis when said arm and reciprocable member are at the said means-limited ends of their rocking and reciprocatory movements, respectively, resilient means reacting against said pad and arm to take up said lost-motion and maintain said cam surface engaged with said end facing surface, said cam surface having an arcuate portion of constant radius having sliding engagement with said end facing surface during movement of the reciprocable member away from said limited end of its movement and having rolling engagement with the said end facing surface during movement of the reciprocable member toward said limited end of its movement and having sliding engagement with said end facing surface during movement of the arm toward said limited end of its movement while said resilient means takes up said lost-motion of said pad.

3. In a motion translating mechanism, a reciprocable member having a surface facing one end of its reciprocatory stroke, an arm longitudinally spaced from and having an axis of rocking movement laterally spaced from said end facing surface, means limiting movement of said arm in the direction away from said end facing surface and movement of said reciprocable member in the direction toward said arm, a pad having a pivotal connection with said arm restraining their relative movement to movement about a single axis extending transversely to the reciprocatory movement of said reciprocable member, said pad having a cam surface engaging said end facing surface and accommodating a limited lost motion of the pad about said single axis when said arm and reciprocable member are at the said means-limited ends of their rocking and reciprocatory movements, respectively, resilient means reacting against said pad and arm to take up said lost-motion and maintain said cam surface engaged with said end facing surface, said cam surface having an arcuate portion of constant radius having rolling engagement with said end facing surface during movement of the reciprocable member toward the said limited end of its movement, and an adjacent portion having sliding engagement with said end facing surface during movement of the arm toward the said limited end of its movement while said resilient means takes up the said lost-motion of said pad.

4. In a valve mechanism, a valve, a valve operating mechanism including actuating means and first and second members with an operating connection therebetween for communicating the valve opening and closing motion of the actuating means to the valve, said connection including a cam pad pivotally mounted on the first member and having a cam surface engaging the second member and accommodating lost-motion between the first and second members when the valve is closed, said cam surface having an arcuate portion formed on a constant radius about the axis of the pivotal mounting and maintained in rolling engagement with a second member when the valve is open and an adjacent portion tangential to said arcuate portion having sliding engagement with said second member when the valve is closed to take up the lost-motion between the first and second members, and a spring mounted between said first member and said cam tending to maintain the tangential portion of said cam surface in contact with said second member.

5. In a mechanical movement, the combination of a reciprocating member and a lever member having intersecting paths of movement, means for intermittently applying operating force to one of said members to actuate the other member from an initial position to a second position, means for returning said members to their initial positions, slack take-up means between said members comprising a pad pivotally mounted with respect to said one member and having a cam surface thereon continuously engaging the other member, said cam surface having an arcuate portion on a constant radius about an axis passing through said pivotal mounting and maintained in rolling engagement with said other member during its movement from said second position to said initial position, and resilient means tending to rotate said pad in a direction to cause said cam surface to take up slack in the system when said other member reaches its initial position upon movement from said second position.

6. In a valve operating mechanism for engines and the like having a camshaft, a cam on said shaft, a rocker intermittently actuated by the cam for operating a valve, a valve silencer comprising a pad pivotally mounted on the rocker and having a cam surface engaging one end of the valve, said cam surface constituting a take-up wedge for accommodating lost-motion in the mechanism and having an arcuate portion for transmitting valve opening and closing movement between said rocker and said valve, said arcuate portion being on a constant radius about an axis passing through the pivotal mounting of said pad and being maintained in rolling engagement with said valve during valve closing movement, and means tending to rotate said pad between said members to take up lost-motion between the rocker and valve during the valve inoperative portions of the rocker movement.

7. A valve silencing mechanism comprising a lever member and a reciprocable valve member having intersecting paths of movement, means for intermittently applying operating force to the mechanism to cause one member to actuate the other member, slack take-up means between said members comprising a cam pad pivotally mounted on one of said members about an axis extending transversely to the path of movement of said other member, said one member having a stop limiting the pivotal movement thereon of said cam pad in one direction, and a spring tending to pivot said cam pad against said stop, said cam pad having an arcuate cam surface of constant radius about an axis passing through the pivotal mounting of said pad and engaging a face on the other of said members for transmitting said operating force and accommodating lost-motion between said members, said axis of said cam surface being slightly eccentric to the axis of said pivotal mounting whereby said arcuate cam surface forms an angle to said face of relatively small slope whereby the transmission of operating force in one direction between said members tends to pivot said cam pad away from said stop, said tendency of said cam pad to pivot away from said stop due to loading of the cam surface off-center of the pivotal axis being overcome by the frictional reaction between said cam surface and said face thereby effecting rotation of said cam pad against said stop during the transmission of operating force between said members in said one direction.

8. A silencing mechanism for a mechanical movement including a reciprocating member and a lever member having intersecting paths of movement, means for intermittently applying operating force to one of said members to actuate the other member, and means for returning said members to their initial positions, said silencing mechanism comprising a take-up cam pad pivotally mounted on said one member and having a cam surface engaging the other member for transmitting said movement and accommodating lost motion between said members, said cam surface having an arcuate portion on a constant radius about an axis passing through said pivotal mounting, a stop on said one member limiting pivoting thereon of said pad during actuation of said other member from its initial position thereby causing slippage to occur between said cam surface and said other member, said arcuate portion forming a relatively small cam angle with said other member and having rolling contact therewith in the return of said other member to its initial position and sliding contact therewith during the lost-motion take-up portions of the movement cycle, and resilient means tending to pivot said cam pad against said stop and in a direction to take up lost-motion in the mechanism.

9. A silencing mechanism for a mechanical movement including a lever member and a reciprocable member having intersecting paths of movement and having means for intermittently applying operating force to cause one member to actuate the other member, comprising, a lost-motion take-up means between said members comprising a pad pivotally mounted with respect to said one member and having a cam surface engaging the other of said members, said cam surface having an arcuate portion formed on a constant radius about an axis fixedly associated with said one member and passing through said pivotal mounting in rolling relation to said other member when said other member is being actuated and a flat portion tangential to said arcuate portion in slidable lost-motion take-up relation to said other member when said other member is not being actuated, and a spring mounted between said one member and said pad tending to maintain said cam surface in contact with said other member thereby causing said pad to take up lost-motion between the members.

10. In a valve operating mechanism, a reciprocable member having a surface facing one end of its reciprocatory stroke, an arm longitudinally spaced from and having an axis of rocking movement laterally spaced from said end facing surface, means limiting movement of said arm in the direction away from said end facing surface and movement of said reciprocable member in the direction toward said arm, a pad having a pivotal connection with said arm restraining their relative movement to movement about a single axis extending transversely to the reciprocatory movement of said reciprocable member, said pad having a cam surface in engagement with said end facing surface, said pad having a limited lost-motion about said single axis while maintaining said engagement when said arm and reciprocable member are at the said means-limited ends of their rocking and reciprocatory movements, respectively, resilient means reacting against said pad and arm to take up said lost-motion and maintain said cam surface engaged with said end facing surface, said cam surface having an arcuate portion of constant radius having rolling engagement with said end facing surface during movement of the reciprocable member toward the said limited end of its movement, and an adjacent portion having sliding engagement with said end facing surface during movement of the arm toward the said limited end of its movement while said resilient means takes up the said lost-motion of said pad.

References Cited in the file of this patent
UNITED STATES PATENTS

| | | |
|---|---|---|
| 1,687,911 | Vincent | Oct. 16, 1928 |
| 1,950,590 | Berry | Mar. 13, 1934 |
| 1,994,743 | Anderson | Mar. 19, 1935 |
| 2,706,974 | Vermaire | Apr. 26, 1955 |

FOREIGN PATENTS

| | | |
|---|---|---|
| 482,153 | Germany | Sept. 7, 1929 |